(12) United States Patent
Kim et al.

(10) Patent No.: US 12,154,033 B2
(45) Date of Patent: Nov. 26, 2024

(54) DEEP NETWORK LEARNING METHOD USING AUTONOMOUS VEHICLE AND APPARATUS FOR THE SAME

(71) Applicant: ELECTRONICS AND TELECOMMUNICATIONS RESEARCH INSTITUTE, Daejeon (KR)

(72) Inventors: Joo-Young Kim, Daejeon (KR); Kyoung-Wook Min, Daejeon (KR); Yong-Woo Jo, Daejeon (KR); Doo-Seop Choi, Daejeon (KR); Jeong-Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 166 days.

(21) Appl. No.: 17/886,198

(22) Filed: Aug. 11, 2022

(65) Prior Publication Data
US 2023/0053134 A1 Feb. 16, 2023

(30) Foreign Application Priority Data

Aug. 13, 2021 (KR) .................. 10-2021-0107341
Jul. 7, 2022 (KR) .................. 10-2022-0083674

(51) Int. Cl.
*G06N 3/08* (2023.01)
*B60W 50/00* (2006.01)
*G05D 1/00* (2024.01)

(52) U.S. Cl.
CPC ............. *G06N 3/08* (2013.01); *B60W 50/00* (2013.01); *G05D 1/0088* (2013.01); *B60W 2050/0018* (2013.01)

(58) Field of Classification Search
None
See application file for complete search history.

(56) References Cited

U.S. PATENT DOCUMENTS 10,365,661 B2 * 7/2019 Jägenstedt .............. B60L 50/52
10,984,287 B2 4/2021 Sato
(Continued)

FOREIGN PATENT DOCUMENTS

CN 109040091 A * 12/2018 ............. H04L 29/06
JP 2019-200769 A 11/2019
(Continued)

OTHER PUBLICATIONS

Machine translation of CN109040091A (Year: 2024).*

*Primary Examiner* — Amelia Vorce

(57) ABSTRACT

Disclosed herein are a deep network learning method using an autonomous vehicle and an apparatus for the same. The deep network learning apparatus includes a processor configured to select a deep network model requiring an update in consideration of performance, assign learning amounts for respective vehicles in consideration of respective operation patterns of multiple autonomous vehicles registered through user authentication, distribute the deep network model and the learning data to the multiple autonomous vehicles based on the learning amounts for respective vehicles, and receive learning results from the multiple autonomous vehicles, and memory configured to store the deep network model and the learning data.

14 Claims, 6 Drawing Sheets

(56) References Cited

U.S. PATENT DOCUMENTS

| | | | | |
|---|---|---|---|---|
| 2012/0029753 A1* | 2/2012 | Johnson | ............... | G05D 1/0265 |
| | | | | 701/23 |
| 2016/0282870 A1* | 9/2016 | Yamamura | ........... | A01D 34/008 |
| 2017/0371544 A1 | 12/2017 | Choi | | |
| 2018/0064024 A1* | 3/2018 | Choi | .................... | G05D 1/0265 |
| 2018/0349313 A1 | 12/2018 | Ahn | | |
| 2019/0003137 A1* | 1/2019 | Gao | ........................ | G01S 15/93 |
| 2019/0294168 A1* | 9/2019 | Dalfra | .................. | G05D 1/0259 |
| 2020/0311546 A1 | 10/2020 | Lee | | |
| 2020/0388154 A1 | 12/2020 | Kim | | |
| 2022/0124973 A1* | 4/2022 | Juel | ........................ | H04W 4/40 |

FOREIGN PATENT DOCUMENTS

| | | |
|---|---|---|
| KR | 10-2016-0082678 A | 7/2016 |
| KR | 10-2019-0103078 A | 9/2019 |
| KR | 10-2021-0056915 A | 5/2021 |
| KR | 10-2021-0070700 A | 6/2021 |
| KR | 10-2021-0070853 A | 6/2021 |
| KR | 10-2021-0090386 A | 7/2021 |

* cited by examiner

DEEP NETWORK LEARNING METHOD USING AUTONOMOUS VEHICLE AND APPARATUS FOR THE SAME

CROSS REFERENCE TO RELATED APPLICATIONS

This application claims the benefit of Korean Patent Application Nos. 10-2021-0107341, filed Aug. 13, 2021 and 10-2022-0083674, filed Jul. 7, 2022, which are hereby incorporated by reference in their entireties into this application.

BACKGROUND OF THE INVENTION

1. Technical Field

The present invention relates generally to deep network learning technology using an autonomous vehicle, and more particularly to technology for training a deep learning network using an autonomous vehicle equipped with a computation device, such as a graphics processing unit, and improving a technology readiness level based on the trained deep learning network.

2. Description of the Related Art

To implement safe autonomous driving, the situation of the area surrounding a vehicle must be perceived, and driving must be able to be determined depending on the perceived situation. For this, various deep-learning technologies for providing accurate recognition and planning performance have recently attracted attention.

Deep learning is configured to train a deep network with learning data and go through an inference process during actual driving using the deep network. Because it is difficult for a deep network generated through initial learning to perfectly respond to all situations, and because advanced technology is continuously being developed, continuous update is essentially required in order to improve the performance of a deep network. For this, a process of adding new data to an existing network and allowing the existing network to additionally perform learning based on the new data, or a process of modifying a network architecture to perform learning based on the new data must be performed. However, for such learning, extensive computing resources are consumed, and thus many institutions that conduct research into deep learning operate large-scale servers capable of training a network by performing a great number of computations.

Further, a large number of computations are also required for inference by a trained deep learning network. For this, a high-performance computation device or processor capable of performing fast computations (operations) in real time must be installed in an autonomous vehicle.

Because a high-performance computation device installed on a server is utilized during training (learning) of a deep learning network, the computation device of the autonomous vehicle may also be utilized for learning of a deep network from the standpoint of the capability of the device itself.

PRIOR ART DOCUMENTS

Patent Documents (Patent Document 1) Korean Patent Application Publication No. 10-2021-0070700, Date of Publication: Jun. 15, 2021 (Title: Method of AI Learning Data Inheritance in Autonomous Driving System)

SUMMARY OF THE INVENTION

Accordingly, the present invention has been made keeping in mind the above problems occurring in the prior art, and an object of the present invention is to provide a scheme for training a deep network using the resources of a vehicle equipped with both a computation device and a power system for driving the computation device when the corresponding vehicle is in an idle state.

Another object of the present invention is to maximize the efficiency of computing resources of an autonomous vehicle, which has strong computing power, but is in an idle state most of the time, and to save space and resources required for operating a server through deep network learning based on the computing resources, thus efficiently managing and advancing a deep network.

A further object of the present invention is to train a deep network using the computing resources of an autonomous driving system in an idle state in the situation in which a driver manually drives a vehicle even in the case in which the vehicle is an autonomous vehicle, or when there is no change in the surrounding environment and the vehicle is temporarily stopped, such as while waiting for a signal.

Yet another object of the present invention is to perform deep network learning using a power system for driving a computation device when such a power system for driving the computation device is constructed, even in an autonomous vehicle based on an internal combustion engine.

Still another object of the present invention is to assign learning amounts for deep network learning in consideration of the reliability of users, thus solving a problem in which, in a crowdsourcing environment, some users, who are incentivized, provide information that is false or meaningless.

In accordance with an aspect of the present invention to accomplish the above objects, there is provided a deep network learning apparatus, including a processor configured to select a deep network model requiring an update in consideration of performance, assign learning amounts for respective vehicles in consideration of respective operation patterns of multiple autonomous vehicles registered through user authentication, distribute the deep network model and the learning data to the multiple autonomous vehicles based on the learning amounts for respective vehicles, and receive learning results from the multiple autonomous vehicles; and memory configured to store the deep network model and the learning data.

Each of the operation patterns may include information about an idle state of an autonomous driving system provided in a corresponding one of the multiple autonomous vehicles.

The idle state of the autonomous vehicle system may correspond to a state in which supply of power is enabled in a situation of at least one of parking, stopping, or manual driving.

The processor may be configured to calculate reliability evaluation scores by performing verification on the learning results based on validation data, adjust the learning amounts for respective vehicles in consideration of the reliability evaluation scores, and set priorities for respective vehicles from which learning is requested using the reliability evaluation scores.

The processor may be configured to check state change histories for respective vehicles by monitoring respective current states of the multiple autonomous vehicles and to adjust the reliability evaluation scores based on the state change histories for the respective vehicles.

The processor may be configured to monitor respective current states of the multiple autonomous vehicles and reassign a learning amount, which was assigned to an autonomous vehicle having deteriorated learning efficiency, to an additional autonomous vehicle when there is an autonomous vehicle having deteriorated learning efficiency due to a mismatch between a current state and an operation pattern of the corresponding vehicle.

The processor may be configured to calculate respective levels of contribution of the multiple autonomous vehicles based on the learning results and provide incentives, corresponding to the respective levels of contribution, to the multiple autonomous vehicles.

The user authentication may include a procedure of agreeing to participate in learning when the autonomous driving system is in an idle state.

The deep network model and the learning data may be encrypted and distributed.

In accordance with another aspect of the present invention to accomplish the above objects, there is provided an autonomous vehicle, including a power supply module for supplying power, an interworking module for obtaining a deep network model and learning data distributed from a deep network learning apparatus and transferring learning results to the deep network learning apparatus, a monitoring module for monitoring an autonomous driving system, a computation module for training the deep network model based on a computing resource corresponding to the autonomous driving system when the autonomous vehicle system is in an idle state, and memory for storing the deep network model and learning data.

In accordance with a further aspect of the present invention to accomplish the above objects, there is provided a deep network learning method performed by a deep network learning apparatus, including selecting a deep network model requiring an update in consideration of performance; assigning learning amounts for respective vehicles in consideration of respective operation patterns of multiple autonomous vehicles registered through user authentication; distributing the deep network model and the learning data to the multiple autonomous vehicles based on the learning amounts for respective vehicles; and receiving learning results from the multiple autonomous vehicles.

Each of the operation patterns may include information about an idle state of an autonomous driving system provided in a corresponding one of the multiple autonomous vehicles.

The idle state of the autonomous vehicle system may correspond to a state in which supply of power is enabled in a situation of at least one of parking, stopping, or manual driving.

The deep network learning method may further include calculating reliability evaluation scores by performing verification on the learning results based on validation data; adjusting the learning amounts for respective vehicles in consideration of the reliability evaluation scores; and setting priorities for respective vehicles from which learning is requested using the reliability evaluation scores.

The deep network learning method may further include checking state change histories for respective vehicles by monitoring respective current states of the multiple autonomous vehicles and adjusting the reliability evaluation scores based on the state change histories for the respective vehicles.

The deep network learning method may further include monitoring respective current states of the multiple autonomous vehicles and reassigning a learning amount, which was assigned to an autonomous vehicle having deteriorated learning efficiency, to an additional autonomous vehicle when there is an autonomous vehicle having deteriorated learning efficiency due to a mismatch between a current state and an operation pattern of the corresponding vehicle.

The deep network learning method may further include calculating respective levels of contribution of the multiple autonomous vehicles based on the learning results and providing incentives, corresponding to the respective levels of contribution, to the multiple autonomous vehicles.

The user authentication may include a procedure of agreeing to participate in learning when the autonomous driving system is in an idle state.

The deep network model and the learning data may be encrypted and distributed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
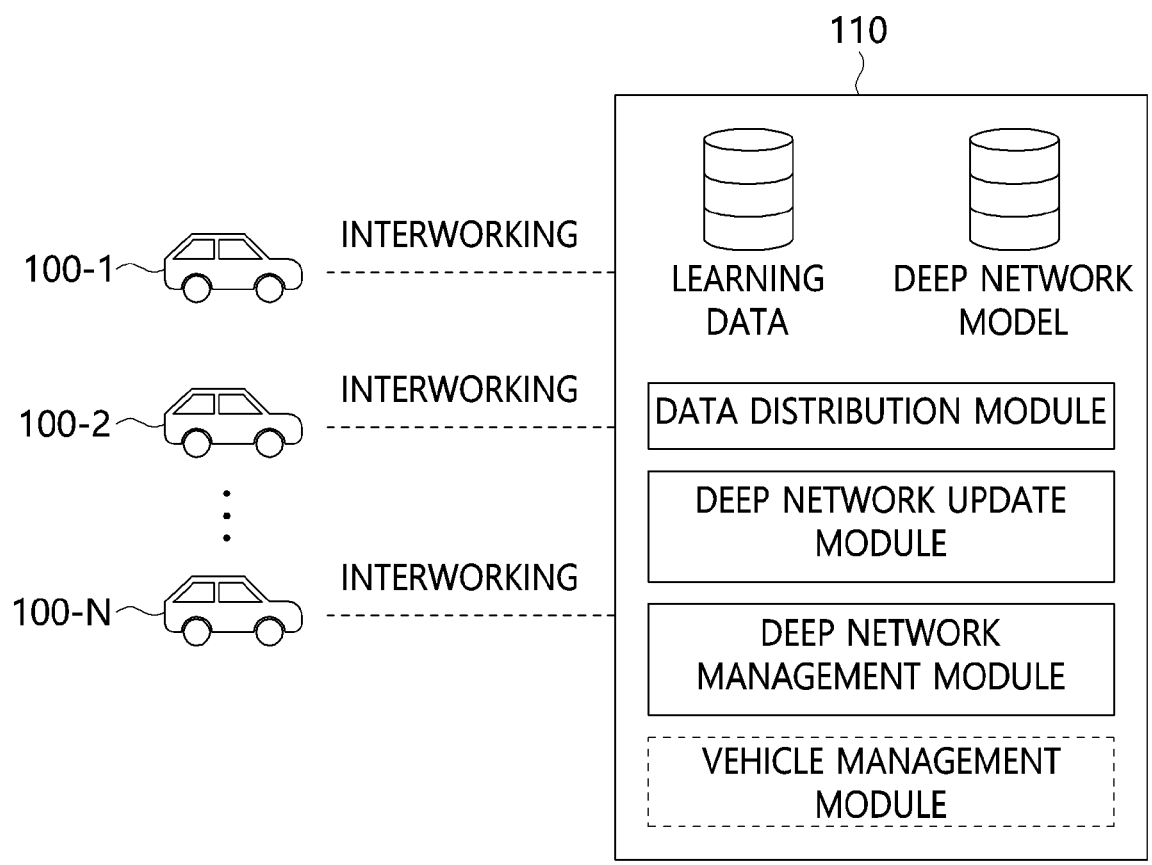
FIG. 1 is a diagram illustrating a deep network learning system using an autonomous vehicle according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Hereinafter, preferred embodiments of the present invention will be described in detail with reference to the attached drawings.

According to a report based on a survey on national traffic by the Ministry of Land, Infrastructure and Transport and a survey on the usage pattern of vehicles in a database (DB) construction project performed in 2013, Korean drivers drive vehicles 56.5 minutes per day on average. Further, the results of analysis of vehicle driving records by the Korea Transportation Safety Authority in 2014 showed that Korean vehicles travel a distance of 46.55 km per day on average in a time of about two hours. Furthermore, according to "The Car Connection", a U.S. media outlet, American people also drive vehicles for about 52 minutes per day on average.

In this way, modern people generally use vehicles to move to a destination for the reason of commuting or the like, and spend their remaining time leading life at the destination. That is, it can be seen that, although there is a slight difference between various statistical results, the time during which each person uses his or her vehicle in one day is considerably limited.

From another aspect, recently, as a part of policies to achieve carbon neutrality, electric vehicles have rapidly propagated to all countries of the world, and respective countries of the world have presented plans to stop producing internal combustion automobiles for the reason of environmental pollution, and thus it is expected that the proportion of electric vehicles will rapidly increase in the future. A large-capacity battery for long-distance driving is essentially required to be installed in such electric vehicles, and autonomous vehicles based on electric vehicles may drive an autonomous driving computation device using the power supplied from the large-capacity battery. Meanwhile, in the case of internal-combustion-engine-based autonomous vehicles, rather than electric vehicles, a system capable of separately supplying power may be provided in order to drive the autonomous driving computation device.

Meanwhile, deep learning technology has come to be used in all technical fields as well as autonomous driving, and a process of continuously performing relearning is needed in order to improve the performance of a deep network. In this case, when the above-described statistical results are aggregated, vehicles are generally in an idle state, such as a parked state, most of the day, and thus a high-performance computation processor installed in each autonomous vehicle and the power of the autonomous vehicle may be utilized to train the deep network.

Therefore, the present invention proposes technology that is capable of training a deep network by utilizing the computing resources of an autonomous vehicle equipped with both a computation device and a power system capable of driving the computation device while the computing resources of the autonomous vehicle are in an idle state.

Hereinafter, a detailed description will be made as to a vehicle that includes a computation device, such as a graphics processing unit, and that is suitably supplied with power and is capable of training a deep network based on the computing power thereof, and a platform (hereinafter referred to as a 'deep network learning apparatus') that develops autonomous driving technology by utilizing the deep network and is installed in the vehicle to provide service and that develops or upgrades the deep network while interworking with the vehicle in various manners, in order to accomplish the objects of the present invention.

FIG. 1 is a diagram illustrating a deep network learning system using an autonomous vehicle according to an embodiment of the present invention.

Referring to FIG. 1, the deep network learning system using an autonomous vehicle according to the embodiment of the present invention includes autonomous vehicles 100-1 to 100-N and a deep network learning apparatus 110.

The autonomous vehicles 100-1 to 100-N illustrated in FIG. 1 may receive learning data, a deep network model, etc. for deep network learning from the deep network learning apparatus 110.

Here, each of the autonomous vehicles 100-1 to 100-N may determine whether computing resources for an autonomous driving system are in an idle state depending on the result of monitoring the state of the corresponding vehicle.

Figure 6:
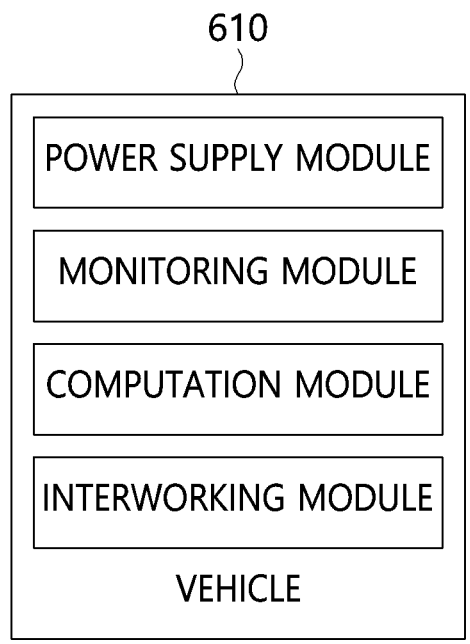
FIG. 6 is a block diagram illustrating an autonomous vehicle according to an embodiment of the present invention.

For example, each of the autonomous vehicles 100-1 to 100-N may be configured using the structure shown in FIG. 6, wherein the traveling of the vehicle and the driving situation of the computation module may be detected through a monitoring module.

When the computation module (computing resource) is in an idle state due to parking, stopping, or manual driving, the deep network model received from the deep network learning apparatus 110 may be trained by utilizing the corresponding resource and the learning data.

Further, referring to FIG. 6, each of the autonomous vehicles 100-1 to 100-N may be equipped with a power supply module including a battery, a battery management system (BMS), a charging system, etc. in the vehicle so as to supply power for learning, and may also be equipped with an interworking module so as to transmit data and the deep network model.

Here, each of the autonomous vehicles 100-1 to 100-N may be supplied with power from an external power source rather than from the power supply module illustrated in FIG. 6.

For example, this case may correspond to the situation in which power is externally supplied, as in the case of charging of an electric vehicle. That is, the power supply module illustrated in FIG. 6 may or may not be installed in an autonomous vehicle 610.

Here, the autonomous vehicles 100-1 to 100-N and the deep network learning apparatus 110 may interwork with each other in real time through wireless communication or the like.

Also, in the case of distribution of data and the deep network, the data and the deep network may be distributed in advance rather than in real time according to a preset plan even if wireless communication is utilized, and a trained deep network model may not be transferred in real time either.

For example, a user may download data and a deep network model from the deep network learning apparatus 110 using a device such as a personal computer (PC) located outside the autonomous vehicles 100-1 to 100-N, and may transfer the downloaded data and deep network model to the autonomous vehicles 100-1 to 100-N using a portable storage device. Thereafter, each of the autonomous vehicles 100-1 to 100-N enables learning (training) of the deep network model to be automatically performed in an idle state. When learning is completed, the user may transfer the results of learning to the external PC using the portable storage device, after which the user may upload the learning results onto the deep network learning apparatus 110.

That is, the interworking module illustrated in FIG. 6 may not be an essential component that is installed in the autonomous vehicle 610.

Thereafter, each of the autonomous vehicles 100-1 to 100-N may transfer the trained deep network model back to the deep network learning apparatus 110, thus obtaining the incentive to participate in deep network learning.

Further, the deep network learning apparatus 110 illustrated in FIG. 1 may manage the learning data and the deep network model.

Here, the deep network learning apparatus 110 may select a deep network model, which is obsolete or has deteriorated performance and therefore requires update, from among the deep network models that are managed thereby, and may distribute the selected deep network model to the autonomous vehicles 100-1 to 100-N.

Here, the deep network learning apparatus 110 may receive the retrained deep network model from the autonomous vehicles 100-1 to 100-N, and may replace the existing network model with the retrained deep network model or upgrade the existing network model to the retrained deep network model.

By utilizing the above-described system, the conventional situation in which a large number of computations for advancing the deep network are performed through an enormous server may be overcome.

Moreover, recently, an extreme shortage of semiconductors has occurred due to problems such as industrial changes caused by electrification of vehicles and autonomous vehicles. This phenomenon causes problems such as stoppage of operation of vehicle production plants or delay in delivery of vehicles, and also incurs social problems resulting therefrom. Further, demand for semiconductors has continuously increased for reasons such as expansion of information communication infrastructure caused by the influence of infectious disease as well as vehicles, cryptocurrency mining and the like.

In relation thereto, the present invention may perform a computational task essential for deep network learning by utilizing an autonomous vehicle, which is equipped with a powerful computation device to have strong computing resources, most of which are in an idle state, thus preventing the occurrence of duplicate semiconductor production by fulfilling additional requirements for semiconductors, and consequently greatly decreasing social inefficiency.

For example, by utilizing autonomous vehicles that are left in a parking lot without being driven during the workdays or weeknights and exploiting the parking lot as a huge server room, demand for computational power, which is expected to continuously and rapidly increase in the future, may be met.

Also, the deep network may be developed through continuous updates, and thus the stability and performance of the autonomous vehicle itself contributing to development may also be improved.

In practice, there are a great number of artificial-intelligence-based technologies used in a detailed system for recognition, planning, and control required for autonomous driving. For example, artificial intelligence may be combined with all detailed elements for recognizing surrounding static and dynamic objects such as lanes, road marks, traffic lights, and pedestrians, establishing driving strategies for vehicles based on the recognized objects to generate global and local paths, and enabling the corresponding vehicle to travel along the generated paths.

In this way, the development of an autonomous vehicle that enables more safe and efficient driving may be accelerated by improving the performance of deep network-based artificial intelligence modules considered to be the core technology of autonomous vehicles.

Further, artificial intelligence has already been widely utilized not only in autonomous driving, but also in various fields, and thus social revolution corresponding to the utilization of artificial intelligence may be referred to as "the fourth industrial revolution". The present invention, which is capable of greatly improving the efficiency of network learning in accordance with the demand for computing resources, which is rapidly increasing for artificial intelligence learning, is expected to be a catalyst for accelerating the fourth industrial revolution.

Meanwhile, crowdsourcing-based systems are problematic in that incentives are not clearly defined, thus making it difficult to elicit users' participation. However, the scheme proposed in the present invention may easily elicit the users' participation from the standpoint of improvement of safety and help in efficient and precise driving, which are important issues affecting autonomous vehicles.

Furthermore, as other problems of crowdsourcing, there are cases in which users provide false information or meaningless information and merely obtain incentives. In this regard, the present invention may solve such problems using a scheme for assigning learning amounts based on the reliability of users.

Figure 2:
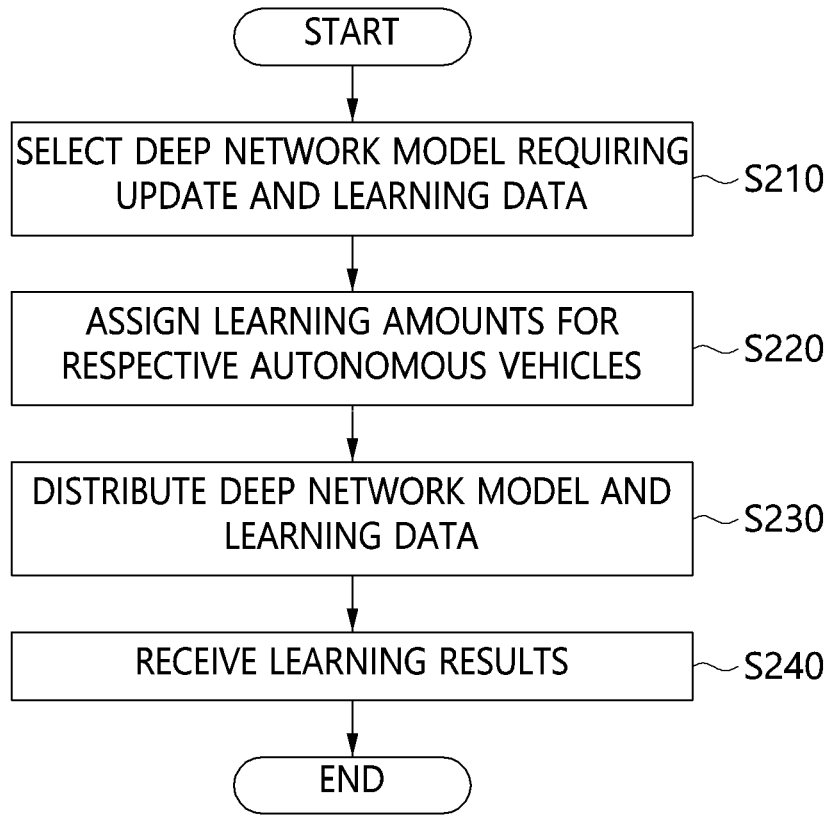
FIG. 2 is an operation flowchart illustrating a deep network learning method using an autonomous vehicle according to an embodiment of the present invention.

FIG. 2 is an operation flowchart illustrating a deep network learning method using an autonomous vehicle according to an embodiment of the present invention.

Referring to FIG. 2, in the deep network learning method using an autonomous vehicle according to the embodiment of the present invention, a deep network learning apparatus selects a deep network model requiring update in consideration of performance at step S210.

Here, the deep network learning apparatus may collect and manage learning data for an autonomous driving service, and may develop and manage various deep network models.

For example, the deep network learning apparatus may identify a deep network model that was updated a long time ago and has thus become obsolete or has deteriorated performance, among the deep network models currently managed by the deep network management module shown in FIG. 1, and may select the deep network model as an update target.

In another example, the deep network learning apparatus may collect deep learning error logs from the autonomous vehicles 100-1 to 100-N illustrated in FIG. 1, and may also select the deep network model to be updated (i.e., an update target) by allowing the deep network management module to utilize the deep learning error logs. By means of this, learning (or training) of a model more urgently requiring update may be performed first by determining the performance of the deep network in detail rather than simply determining whether each deep network model has become obsolete based on an update time, thus improving overall autonomous driving performance. Further, more suitable data for upgrading the deep network models may be prepared based on the deep learning error logs collected from the autonomous vehicles 100-1 to 100-N, and the performance of the deep network trained through more suitable data may be further improved.

Here, the deep network learning apparatus may upload learning data for training a deep network model identified as an update target, through the deep network management module illustrated in FIG. 1, and may map the learning data to the corresponding deep network model. Furthermore, when a new deep network model is developed, the deep network management module may store information about the corresponding deep network model in a deep network model database (DB), and may store and manage related learning data in a learning data DB.

Here, the deep network mode selected as the update target is not limited to a deep network for autonomous driving, and may include deep networks corresponding to various fields and purposes.

Further, in the deep network learning method using an autonomous vehicle according to the embodiment of the present invention, the deep network learning apparatus assigns learning amounts for respective autonomous vehicles in consideration of respective operation patterns of multiple autonomous vehicles registered through user authentication at step S220.

In this case, the deep network learning apparatus according to the embodiment of the present disclosure may interwork in real time with multiple autonomous vehicles which provide autonomous driving service via wireless communication. Therefore, each of the autonomous vehicles interworking with the deep network learning apparatus may provide, in real time, the deep network learning apparatus with the corresponding vehicle's own information such as computational power or the like of an autonomous driving system (i.e., a computation device) and the state information of the autonomous driving system, monitored by the corresponding vehicle itself.

For example, the deep network learning apparatus may periodically collect and manage vehicle information related to the autonomous vehicles 100-1 to 100-N currently interworking therewith through the vehicle management module illustrated in FIG. 1.

Here, user authentication may include a procedure for agreeing to participate in learning when each autonomous driving system is in an idle state.

Figure 3:
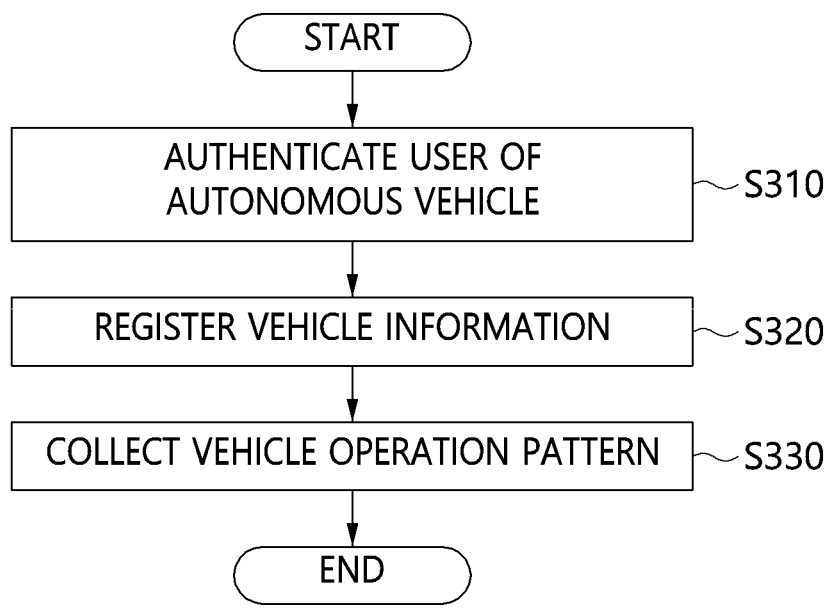
FIG. 3 is an operation flowchart illustrating in detail a preliminary step performed prior to a learning step included in a deep network learning process according to an embodiment of the present invention.

For example, the procedure for user authentication corresponds to a preliminary step for deep network learning. Referring to FIG. 3, use authentication for the corresponding autonomous vehicle may be performed by obtaining the authentication information through a procedure for registering the user or owner of the autonomous vehicle at step S310.

Thereafter, vehicle-related information, such as the model and type of each autonomous vehicle and the computing resources and maximum power of the autonomous vehicle, may be registered at step S320.

Thereafter, a vehicle operation pattern, such as the driving time and distance of each autonomous vehicle in usual days, information about whether autonomous driving is performed, and usage of computing resources in a driving section, may be collected and stored at step S330.

Here, the vehicle operation pattern may include information about the idle state of the autonomous driving system provided in each of the multiple autonomous vehicles.

Here, the idle state of each autonomous driving system may correspond to a state in which the supply of power is enabled in the situation of at least one of parking, stopping, or manual driving.

That is, in the present invention, the time during which each of the multiple autonomous vehicles is in an idle state (i.e., the time during which deep network learning is possible) may be detected based on the operation patterns for respective vehicles, and computational loads (learning amounts) for respective vehicles for learning or training of a single deep network may be calculated in consideration of a period corresponding to the detected idle state, system resources available in the idle state, or the like.

For example, learning amounts are assigned to respective vehicles so that a vehicle including an autonomous driving system having sufficient idle time performs more learning, thus more efficiently and rapidly completing learning than the case where the same learning amount is assigned to all vehicles.

In another example, learning amounts for learning of the deep network model may be differentially assigned based on the processing performance or available system resources for respective vehicles, thus improving learning efficiency.

Here, the present invention may assign computational loads (learning amounts) required for learning of the deep network not only to the autonomous vehicles but also to other deep learning servers. However, for convenience of description, in the entire specification, a description will be mainly made based on the assignment of learning amounts to autonomous vehicles.

Further, although not illustrated in FIG. 2, in the deep network learning method using an autonomous vehicle according to the embodiment of the present invention, the deep network learning apparatus may monitor respective current states of multiple autonomous vehicles, and may reassign a learning amount, which was assigned to an autonomous vehicle having deteriorated learning efficiency, to another autonomous vehicle when there is an autonomous vehicle having deteriorated learning efficiency because the current state of the corresponding autonomous vehicle does not match the operation pattern thereof.

For example, although an autonomous vehicle is parked and determined to be in an idle state based on the operation pattern thereof and learning has started in the corresponding autonomous vehicle, it may be difficult to continue to perform learning if the autonomous vehicle suddenly starts autonomous driving, unlike a usual pattern, and exits the idle state.

In this case, it may be detected that the autonomous vehicle according to the present invention exits the idle state through the monitoring module illustrated in FIG. 6. Also, a learning progress situation, a learning intermediate result, information about a destination to which the vehicle is traveling in an autonomous driving manner, the distance to the destination, arrival time information, etc. may be transferred to the deep network learning apparatus through the interworking module.

That is, the present invention may include a configuration for sharing the states, learning progress situations, etc. of respective autonomous vehicles with the deep network learning apparatus in consideration of the characteristics of each vehicle, which is capable of exiting an idle state at any time, and then improving learning efficiency. For this, each of the multiple autonomous vehicles according to the present invention may periodically provide information, such as the state of the corresponding autonomous vehicle, idle resources, power, whether the corresponding autonomous vehicle is traveling, whether autonomous driving is used during traveling, a learning stage when the corresponding autonomous vehicle performs learning, or an intermediate result, to the deep network learning apparatus.

For example, each autonomous vehicle may perform real-time communication with the deep network learning apparatus through an interworking module including wireless communication equipment such as vehicle-to-everything (V2X) equipment.

Thereafter, the deep network learning apparatus may collect pieces of information from the autonomous vehicles, may check the progress situation of learning performed in a vehicle, in which a sudden change in the state has occurred, and the remaining distance of autonomous driving, and may determine whether to allow the corresponding autonomous vehicle to perform the remaining learning or to newly request an additional autonomous vehicle in an idle state to perform learning.

In an example, when it is determined to be more efficient to utilize an additional autonomous vehicle in an idle state, the learning amount and the deep network model, which were assigned to the corresponding vehicle, may be reassigned to an additional autonomous vehicle in an idle state, thus completing learning.

In another example, when the corresponding vehicle stops provision of information that is periodically performed, without a separate state change message, it may be determined that the corresponding vehicle cannot participate in learning for a reason such as discharge or network failure, and the learning amount assigned to the corresponding vehicle may be reassigned to an additional autonomous vehicle in an idle state, thus completing learning.

In a further example, when the corresponding vehicle enters a section in which a driving pattern is monotonous, such as on an expressway, and in which a driving mode is expected to switch to an autonomous driving mode while traveling in a manual driving mode, the deep network learning apparatus may reassign learning amounts in consideration of a scheduled traveling path and the remaining learning amount.

However, when the remaining distance, which the vehicle must travel to move to the destination, and the remaining learning amount are not large, learning may be completed by the corresponding vehicle by waiting for the vehicle to enter an idle state.

The embodiment in which reassignment is performed as described above is not limited to the case where the autonomous vehicle starts autonomous driving unlike an operation pattern while being parked, and may also be applied to other similar cases, such as the situation in which the autonomous driving system (i.e., a computation module) of the vehicle exits an idle state as in the case where the vehicle starts learning while traveling in a manual driving mode, but suddenly switches to an autonomous driving mode. Further, this may also be applied to the case where a power limit suddenly occurs and it therefore becomes difficult to perform learning.

Next, in the deep network learning method using an autonomous vehicle according to the embodiment of the present invention, the deep network learning apparatus distributes the deep network model and learning data to the multiple autonomous vehicles based on the learning amounts of respective vehicles at step S230.

For example, referring to FIG. 1, the data distribution module of the deep network learning apparatus 110 may fetch learning data and the deep network model, managed by the deep network management module, from respective DBs, and may distribute the learning data and the deep network model to autonomous vehicles 110-1 to 110-N in an idle state.

Here, the deep network model and the learning data may be encrypted and distributed.

Therefore, the multiple autonomous vehicles may perform learning after going through a process of decrypting the deep network model and the learning data, which are encrypted and distributed.

Further, in the deep network learning method using an autonomous vehicle according to the embodiment of the present invention, the deep network learning apparatus receives results of learning from the multiple autonomous vehicles at step S240.

For example, referring to FIG. 1, the deep network update module of the deep network learning apparatus 110 may finally update the corresponding deep network model based on the results of learning. Thereafter, the deep network management module may update and manage a newly stored history of the deep network, thus enabling the updated and managed information to be utilized as reference data required for enhancing the deep network in the future.

Here, the learning results may correspond to results indicating the situation in which learning is completed to the end, or to intermediate results of learning. That is, the multiple autonomous vehicles may transfer intermediate results even if learning is not yet completed.

Here, the learning results may be encrypted by and received from the multiple autonomous vehicles, and the deep network learning apparatus may decrypt the received learning results and utilize the learning results for updating the deep network.

Further, although not illustrated in FIG. 2, in the deep network learning method using an autonomous vehicle according to the embodiment of the present invention, the deep network learning apparatus may calculate reliability evaluation scores by verifying the learning results based on validation data.

That is, the deep network learning method according to the present invention needs to check the reliability of learning results because an unspecified number of users participate in learning. Therefore, reliability evaluation may be performed by verifying the precision of deep network inference in such a way as to apply separate validation data to the trained deep network model received as a result of the learning.

Although not illustrated in FIG. 2, the deep network learning method using an autonomous vehicle according to the embodiment of the present invention may set priorities for respective vehicles from which learning is requested using respective reliability evaluation scores.

That is, priorities may be set such that learning can be principally requested from users having higher reliability by evaluating the reliability of users or autonomous vehicles that participate in deep network learning based on the reliability evaluation scores.

Although not illustrated in FIG. 2, the deep network learning method using an autonomous vehicle according to the embodiment of the present invention may adjust learning amounts for respective vehicles in consideration of respective reliability evaluation scores.

Here, state change histories for respective vehicles may be checked by monitoring respective current states of the multiple autonomous vehicles, and the reliability evaluation scores may be adjusted based on the state change histories for respective vehicles.

Here, the state change histories may be recorded when the vehicles are operated differently from operation patterns for respective vehicles. For example, this may correspond to the case in which the autonomous driving system exits an idle state differently from an operation pattern, as in the situation in which the corresponding vehicle starts autonomous driving at a time at which the vehicle is usually parked and therefore in an idle state, or the situation in which the vehicle is usually traveling in a manual driving mode, but suddenly switches to an autonomous driving mode.

Here, the reliability evaluation score of an autonomous vehicle or a user for which a state change frequently occurs may be adjusted to a lower score. By means of such adjustment, control may be performed such that the priority, with which learning requests are assigned to such vehicles and which is set depending on reliability evaluation scores, is reduced or such that learning amounts for respective vehicles are assigned as small as possible.

Alternatively, state change histories for respective vehicles may be provided separately from reliability evaluation scores by including the state change histories for respective vehicles in reliability evaluation and submitting reliability evaluation scores.

Therefore, the deep network learning apparatus according to the embodiment of the present invention may manage the reliability evaluation scores and the state change histories for respective vehicles through the deep network management module illustrated in FIG. 1, and may select an autonomous vehicle from which learning is to be requested and assign a learning amount to the selected autonomous vehicle by collectively performing determination together with the information provided by the vehicle management module.

Furthermore, although not illustrated in FIG. 2, the deep network learning method using an autonomous vehicle according to the embodiment of the present invention may calculate respective levels of contribution of the multiple autonomous vehicles based on the results of learning, and may provide incentives, corresponding to the respective levels of contribution, to the multiple autonomous vehicles.

Here, the incentives are provided to the owners or users of the autonomous vehicles, thus inducing the owners or users to voluntarily participate in learning to improve the deep network.

Figure 5:
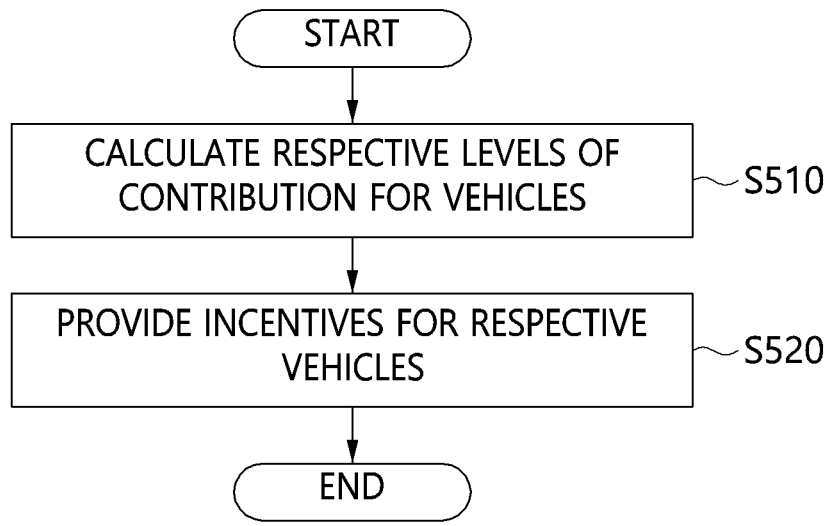
FIG. 5 is an operation flowchart illustrating in detail a follow-up step performed after the learning step included in the deep network learning process according to an embodiment of the present invention.

Here, a process of providing incentives corresponds to a follow-up step for deep network learning, and may be performed by calculating the levels of contributions of the multiple autonomous vehicles participating in learning, as illustrated in FIG. 5, at step S510 and by providing incentives to respective vehicles based on the calculated contribution levels at step S520.

For example, various incentives such as the latest deep network model, a vehicle management coupon, and (autonomous driving subscription) service discount coupon, may be provided, but the incentives are not limited to any specific items.

Below, the above-described learning process will be described in detail from the standpoint of the deep network learning apparatus with reference to FIG. 4.

Figure 4:
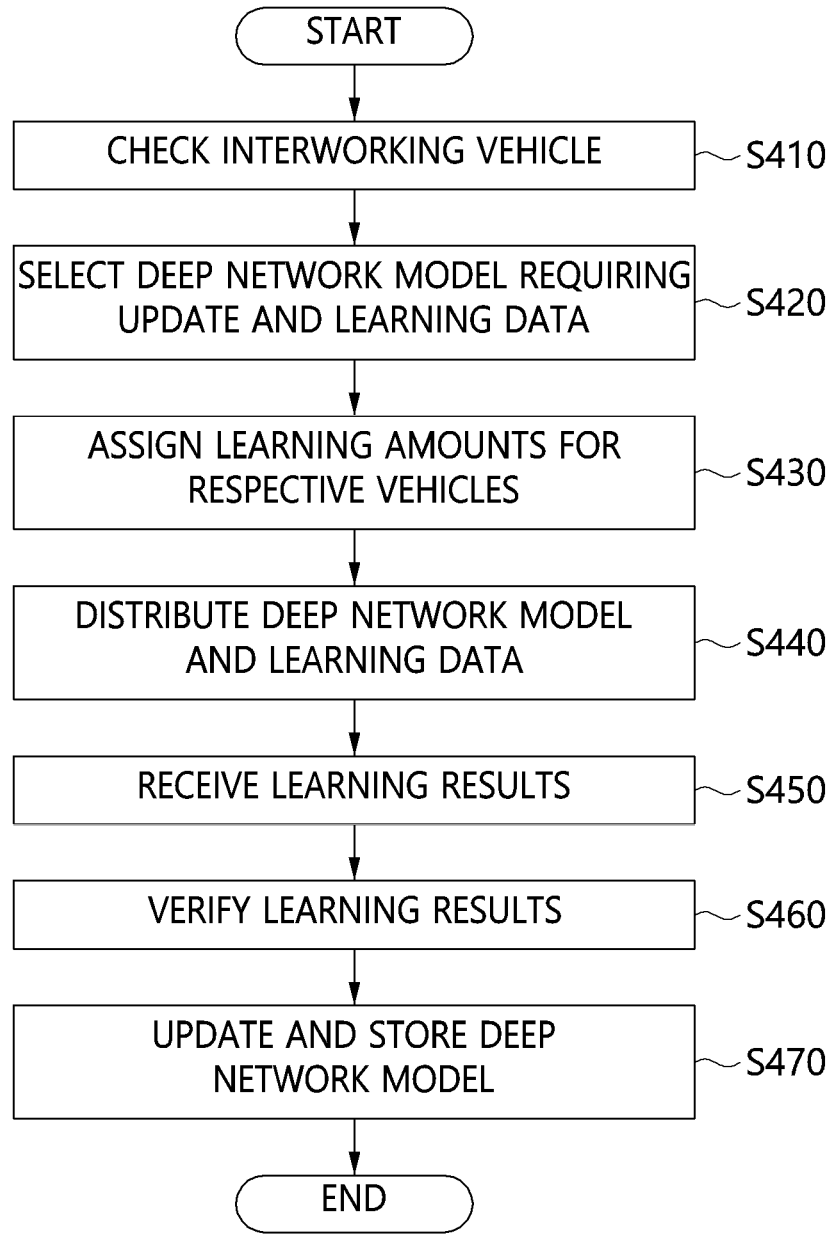
FIG. 4 is an operation flowchart illustrating in detail the learning step included in the deep network learning process according to an embodiment of the present invention.

Referring to FIG. 4, the deep network learning apparatus may identify autonomous vehicles interworking therewith through wireless communication or the like at step S410, and may select a deep network model to be updated through the identified vehicles and learning data corresponding thereto at step S420.

Thereafter, learning amounts for respective vehicles for update of the deep network model may be assigned to respective interworking vehicles in consideration of operation patterns collected for respective interworking vehicles at step S430.

Thereafter, deep network learning may be performed by distributing the deep network model and learning data to respective autonomous vehicles according to the assigned learning amounts at step S440.

Next, the results of learning may be received from autonomous vehicles to which the deep network model and the learning data are distributed at step S450, and a verification procedure for the learning results may be performed at step S460.

Thereafter, the deep network model may be updated based on the verified learning results, and the updated final model may be stored as the deep network model at step S470.

By means of the above-described deep network learning method using an autonomous vehicle, the efficiency of deep network learning may be improved, and the deep network may be efficiently managed and developed.

Further, the efficiency of deep network learning may be improved by utilizing a driving pattern such as the pattern in which modern people drive their vehicles only to commute during rush hour.

Figure 7:
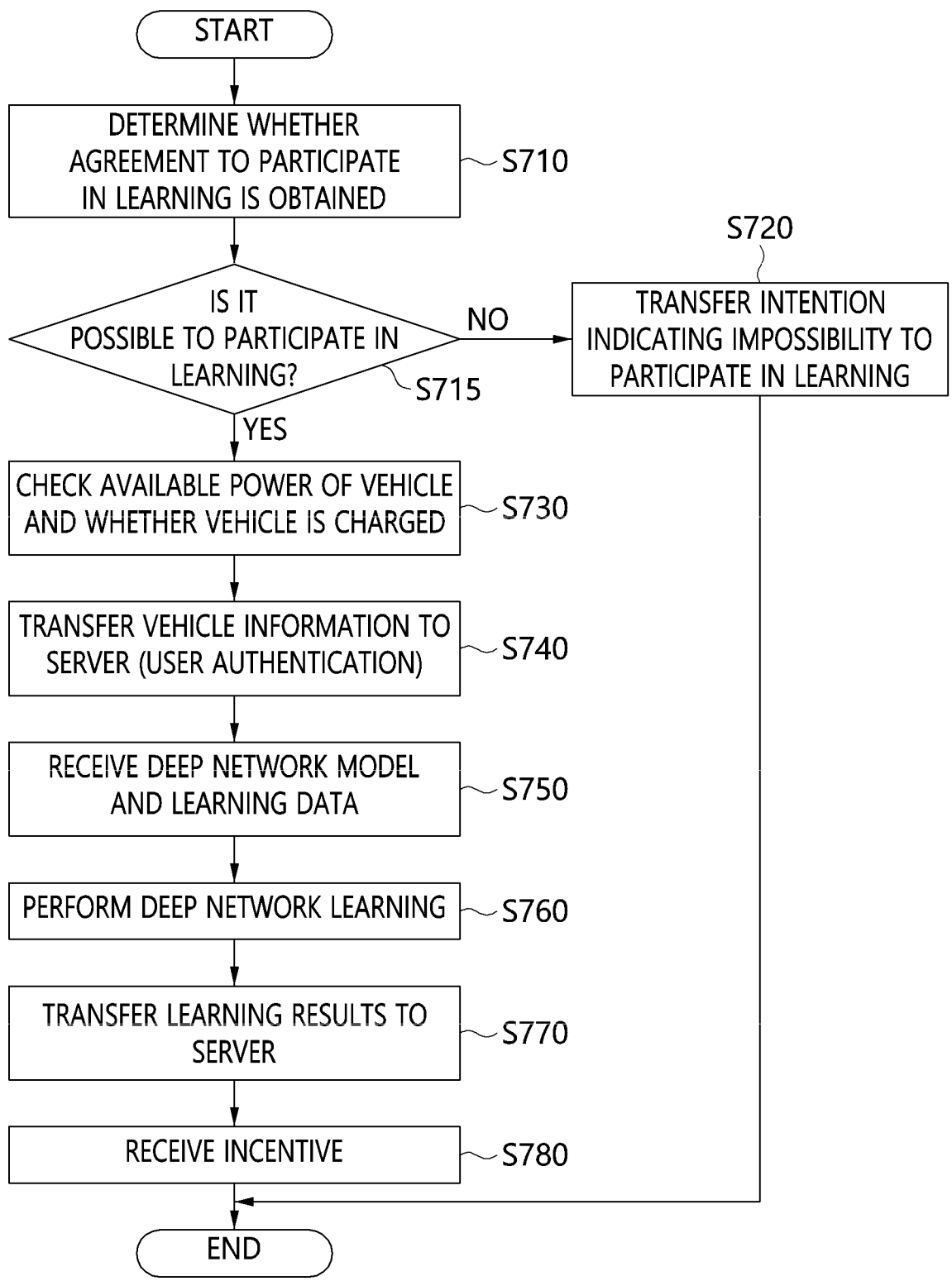
FIG. 7 is an operation flowchart illustrating in detail a process of performing deep network learning in an autonomous vehicle according to the present invention.

FIG. 7 is an operation flowchart illustrating in detail a process of performing deep network learning in an autonomous vehicle according to the present invention.

Referring to FIG. 7, in the process of performing deep network learning in the autonomous vehicle according to the present invention, a procedure for confirming whether a vehicle owner or user agrees to participate in deep network learning in the idle state of the corresponding autonomous vehicle may be performed either before the autonomous vehicle starts to travel or at the stage in which the autonomous vehicle is purchased at step S710.

For example, whether the vehicle owner or user agrees to participate in deep network learning may be confirmed in such a way as to output a query statement querying the user whether to participate in deep network learning via a display device or the like installed in the autonomous vehicle and prompt the vehicle owner or user to input an answer to the query statement.

Thereafter, in the situation in which the vehicle owner or user has agreed to participate in learning, whether the corresponding vehicle is capable of participating in learning of a deep network model may be determined by understanding the current driving state of the vehicle and usage of computing resources in the vehicle corresponding thereto at step S715.

As a result of the determination at step S715, when the autonomous vehicle is found to be incapable of participating in deep network learning, the intention indicating impossibility to participate in learning may be transferred to the deep network learning apparatus (server) at step S720.

Further, as a result of the determination at step S715, when the autonomous vehicle is found to be capable of participating in deep network learning, available power and whether power is charged when computing resources in the vehicle are in an idle state may be checked at step S730.

Thereafter, vehicle information including vehicle characteristics such as available computing resources, a driving state, and a power level when computing resources in the vehicle are in an idle state may be transferred to the deep network learning apparatus (server) at step S740.

Here, at step S740, a user authentication procedure may also be performed for security of the transferred data.

Thereafter, a deep network model and learning data required for learning may be received from the deep network learning apparatus (server) at step S750, and learning of the deep network model may be performed using the received learning data at step S760.

Here, the deep network model and the learning data received from the deep network learning apparatus (server) may be encrypted and received. Therefore, in the autonomous vehicle, learning may be performed after going through a procedure of decrypting the encrypted data.

Next, the deep network model having completed in learning (learning results) may be transferred back to the deep network learning apparatus (server) at step S770, and an incentive for participating in learning may be received from the deep network learning apparatus (server) at step S780.

For example, the incentive may be paid in the form of a coupon, points, or a service discount coupon in proportion to the contribution to the development of the corresponding deep network model.

Here, the learning results transferred from the autonomous vehicle to the deep network learning apparatus (server) may be encrypted and transferred.

Figure 8:
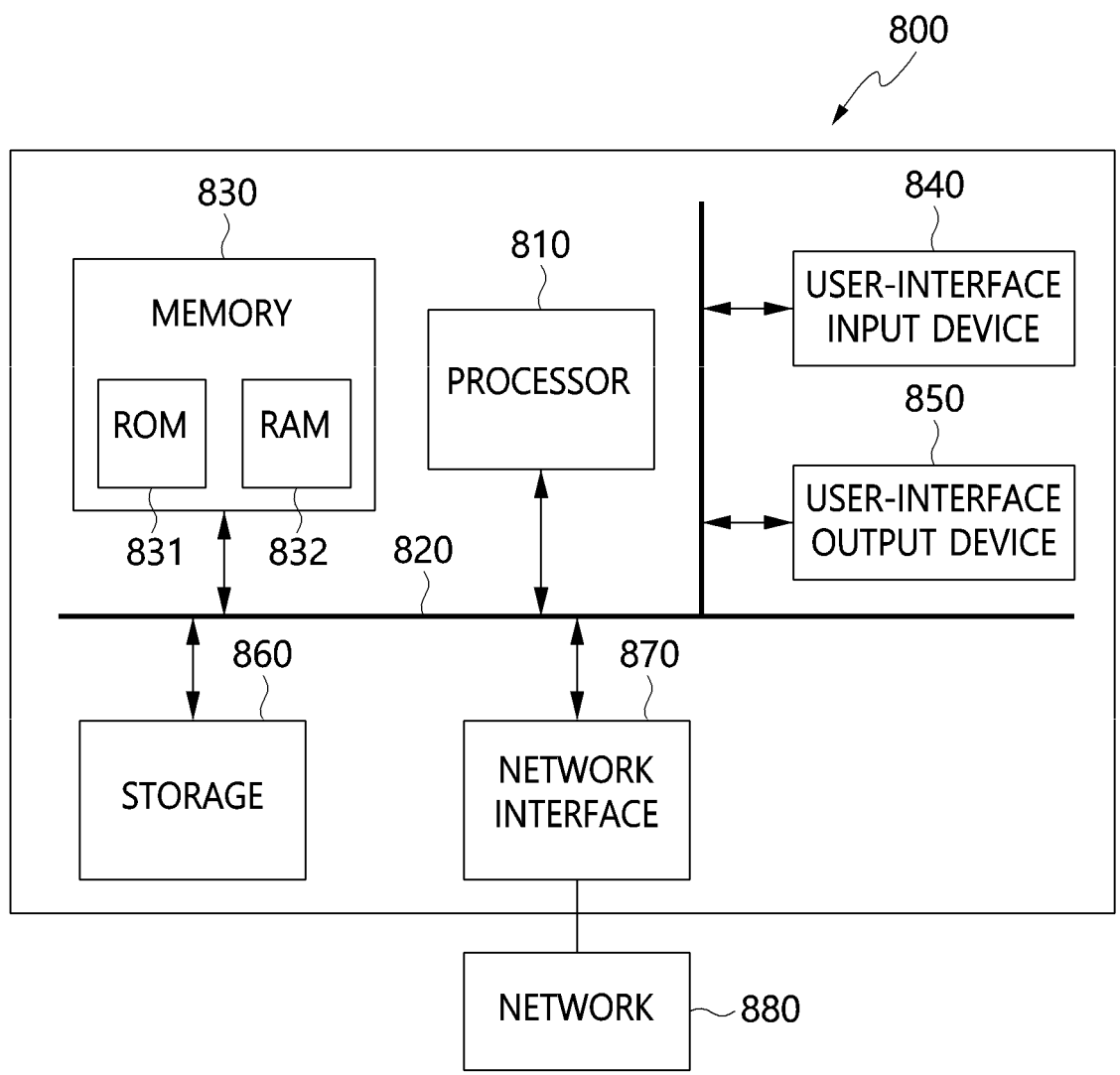
FIG. 8 is a diagram illustrating a deep network learning apparatus using an autonomous vehicle according to an embodiment of the present invention.

FIG. 8 is a diagram illustrating a deep network learning apparatus using an autonomous vehicle according to an embodiment of the present invention.

Referring to FIG. 8, a deep network learning apparatus using an autonomous vehicle according to an embodiment of the present invention may be implemented in a computer system, such as a computer-readable storage medium. As illustrated in FIG. 8, a computer system 800 may include one or more processors 810, memory 830, a user interface input device 840, a user interface output device 850, and storage 860, which communicate with each other through a bus 820. The computer system 800 may further include a network interface 870 connected to a network 880. Each processor 810 may be a Central Processing Unit (CPU) or a semiconductor device for executing processing instructions stored in the memory 830 or the storage 860. Each of the memory 830 and the storage 860 may be any of various types of volatile or nonvolatile storage media. For example, the memory 830 may include Read-Only Memory (ROM) 831 or Random Access Memory (RAM) 832.

Accordingly, an embodiment of the present invention may be implemented as a non-transitory computer-readable storage medium in which methods implemented using a computer or instructions executable in a computer are recorded. When the computer-readable instructions are executed by the processor, the computer-readable instructions may perform a method according to at least one aspect of the present invention.

The processor 810 selects a deep network model requiring update in consideration of performance.

The processor 810 assigns learning amounts for respective autonomous vehicles in consideration of respective operation patterns of multiple autonomous vehicles registered through user authentication.

Here, user authentication may include a procedure for agreeing to participate in learning when each autonomous driving system is in an idle state Here, the vehicle operation pattern may include information about the idle state of the autonomous driving system provided in each of the multiple autonomous vehicles.

Here, the idle state of each autonomous driving system may correspond to a state in which the supply of power is enabled in the situation of at least one of parking, stopping, or manual driving.

Further, the processor 810 may monitor respective current states of multiple autonomous vehicles, and may reassign a learning amount, which was assigned to an autonomous vehicle having deteriorated learning efficiency, to another autonomous vehicle when there is an autonomous vehicle having deteriorated learning efficiency because the current state of the corresponding autonomous vehicle does not match the operation pattern thereof.

The processor 810 distributes the deep network model and the learning data to the multiple autonomous vehicles based on the learning amounts for respective vehicles.

Here, the deep network model and the learning data may be encrypted and distributed.

The processor 810 receives learning results from the multiple autonomous vehicles.

The processor 810 may calculate reliability evaluation scores by verifying the learning results based on validation data.

The processor 810 may set priorities for respective vehicles from which learning is requested using respective reliability evaluation scores.

The processor 810 may adjust learning amounts for respective vehicles in consideration of the reliability evaluation scores.

Here, state change histories for respective vehicles may be checked by monitoring respective current states of the multiple autonomous vehicles, and the reliability evaluation scores may be adjusted based on the state change histories for respective vehicles.

Further, the processor 810 may calculate respective levels of contribution of the multiple autonomous vehicles based on the learning results, and may provide incentives, corresponding to the respective levels of contribution, to the multiple autonomous vehicles.

Here, although, in FIG. 8, an example in which the deep network learning apparatus is driven by the processor 810 is illustrated, the deep network learning apparatus according to the embodiment of the present invention may be driven in the state of being separated into sub-modules respectively corresponding to a data distribution module, a deep network update module, a deep network management module, and a vehicle management module, as illustrated in FIG. 1.

Furthermore, the operation of the deep network learning apparatus according to the embodiment of the present invention is not necessarily performed by the manufacturers of the autonomous vehicles, and may be performed to also include an entity (institution) that provides, maintains, and updates autonomous driving technology, and an entity that can interwork with autonomous vehicles.

By utilizing the deep network learning apparatus using an autonomous vehicle, the efficiency of deep network learning may be improved, and the deep network may be efficiently managed and developed.

According to the present invention, there can be provided a scheme for training a deep network using the resources of a vehicle equipped with both a computation device and a power system for driving the computation device when the corresponding vehicle is in an idle state.

Further, the present invention may maximize the efficiency of computing resources of an autonomous vehicle, which has strong computing power, but is in an idle state most of the time, and to save space and resources required for operating a server through deep network learning based on the computing resources, thus efficiently managing and developing a deep network.

Furthermore, the present invention may train a deep network using the computing resources of an autonomous driving system in an idle state in the situation in which a driver manually drives a vehicle even in the case in which the vehicle is an autonomous vehicle, or when there is no change in the surrounding environment and the vehicle is temporarily stopped, such as while waiting for a signal.

Furthermore, the present invention may perform deep network learning using a power system for driving a computation device when such a power system for driving the computation device is constructed, even in an autonomous vehicle based on an internal combustion engine.

Furthermore, the present invention may assign learning amounts for deep network learning in consideration of the reliability of users, thus solving a problem in which, in a crowdsourcing environment, some users, who are incentivized, provide information that is false or meaningless.

As described above, in the deep network learning method using an autonomous vehicle and the apparatus for the deep network learning method according to the present invention, the configurations and schemes in the above-described embodiments are not limitedly applied, and some or all of the above embodiments can be selectively combined and configured such that various modifications are possible.

What is claimed is:

1. A deep network learning apparatus, comprising:
a processor configured to select a deep network model requiring an update in consideration of performance, assign learning amounts for multiple autonomous vehicles in consideration of respective operation patterns of the multiple autonomous vehicles registered through user authentication, distribute the deep network model and learning data to the multiple autonomous vehicles based on the learning amounts for the multiple autonomous vehicles, and receive learning results from the multiple autonomous vehicles; and
a memory configured to store the deep network model and the learning data,
wherein each of the operation patterns includes information about an idle state of an autonomous driving system provided in a corresponding one of the multiple autonomous vehicles,
wherein the processor is configured to differentially assign the learning amounts for the multiple autonomous vehicles considering a period corresponding to the idle state and system resources available in the idle state, and
wherein the processor is configured to calculate reliability evaluation scores by performing verification on the learning results based on validation data, adjust the learning amounts for the multiple autonomous vehicles in consideration of the reliability evaluation scores, and set priorities for the multiple autonomous vehicles from which learning is requested using the reliability evaluation scores.

2. The deep network learning apparatus of claim 1, wherein the idle state of the autonomous driving system corresponds to a state in which supply of power is enabled in a situation of at least one of parking, stopping, or manual driving.

3. The deep network learning apparatus of claim 1, wherein the processor is configured to check state change histories for the multiple autonomous vehicles by monitoring respective current states of the multiple autonomous vehicles and to adjust the reliability evaluation scores based on the state change histories for the multiple autonomous vehicles.

4. The deep network learning apparatus of claim 1, wherein the processor is configured to monitor respective current states of the multiple autonomous vehicles and reassign a learning amount, which was assigned to an autonomous vehicle having deteriorated learning efficiency, to an additional autonomous vehicle when there is an autonomous vehicle having deteriorated learning efficiency due to a mismatch between a current state and an operation pattern of the corresponding vehicle.

5. The deep network learning apparatus of claim 1, wherein the processor is configured to calculate respective levels of contribution of the multiple autonomous vehicles based on the learning results and provide incentives, corresponding to the respective levels of contribution, to the multiple autonomous vehicles.

6. The deep network learning apparatus of claim 1, wherein the user authentication comprises a procedure of agreeing to participate in learning when the autonomous driving system is in the idle state.

7. The deep network learning apparatus of claim 1, wherein the deep network model and the learning data are encrypted and distributed.

8. A deep network learning method performed by a deep network learning apparatus, the method comprising:
selecting a deep network model requiring an update in consideration of performance;
assigning learning amounts for multiple autonomous vehicles in consideration of respective operation patterns of the multiple autonomous vehicles registered through user authentication;
distributing the deep network model and learning data to the multiple autonomous vehicles based on the learning amounts for the multiple autonomous vehicles; and
receiving learning results from the multiple autonomous vehicles,
wherein each of the operation patterns includes information about an idle state of an autonomous driving system provided in a corresponding one of the multiple autonomous vehicles, and
wherein the method further comprises:
differentially assigning the learning amounts for the multiple autonomous vehicles considering a period corresponding to the idle state and system resources available in the idle state,
calculating reliability evaluation scores by performing verification on the learning results based on validation data;
adjusting the learning amounts for the multiple autonomous vehicles in consideration of the reliability evaluation scores; and
setting priorities for the multiple autonomous vehicles from which learning is requested using the reliability evaluation scores.

9. The deep network learning method of claim 8, wherein the idle state of the autonomous driving system corresponds to a state in which supply of power is enabled in a situation of at least one of parking, stopping, or manual driving.

10. The deep network learning method of claim 8, further comprising:
checking state change histories for the multiple autonomous vehicles by monitoring respective current states of the multiple autonomous vehicles and adjusting the reliability evaluation scores based on the state change histories for the multiple autonomous vehicles.

11. The deep network learning method of claim 8, further comprising:
monitoring respective current states of the multiple autonomous vehicles and reassigning a learning amount, which was assigned to an autonomous vehicle having deteriorated learning efficiency, to an additional autonomous vehicle when there is an autonomous vehicle having deteriorated learning efficiency due to a mismatch between a current state and an operation pattern of the corresponding vehicle.

12. The deep network learning method of claim 8, further comprising:
calculating respective levels of contribution of the multiple autonomous vehicles based on the learning results and providing incentives, corresponding to the respective levels of contribution, to the multiple autonomous vehicles.

13. The deep network learning method of claim 8, wherein the user authentication comprises a procedure of agreeing to participate in learning when the autonomous driving system is in the idle state.

14. The deep network learning method of claim 8, wherein the deep network model and the learning data are encrypted and distributed.

\* \* \* \* \*